US012645529B1

(12) United States Patent
Somani et al.

(10) Patent No.: US 12,645,529 B1
(45) Date of Patent: Jun. 2, 2026

(54) COMPUTER-BASED SYSTEMS CONFIGURED FOR OPTIMIZING COMPUTING RESOURCE(S) AND METHODS OF USE THEREOF

(71) Applicant: Go Daddy Operating Company, LLC, Tempe, AZ (US)

(72) Inventors: Devashish Somani, Gurugram (IN); Bhajnik Singh Chadha, Gurugram (IN); John Bush, Tempe, AZ (US); Manish Kumar Agarwal, Gurugram (IN); Harsheen Kaur Sood, Gurugram (IN)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 19/232,394

(22) Filed: Jun. 9, 2025

(51) Int. Cl.
 *G06F 11/00* (2006.01)
 *G06F 9/50* (2006.01)
 *G06F 11/07* (2006.01)
(52) U.S. Cl.
 CPC ........ *G06F 11/0793* (2013.01); *G06F 9/5033* (2013.01); *G06F 11/0721* (2013.01)

(58) Field of Classification Search
 CPC ............. G06F 11/0793; G06F 11/0721; G06F 11/2263
 See application file for complete search history.

(56) References Cited

U.S. PATENT DOCUMENTS

2025/0045531 A1 * 2/2025 Hayes .................... G06F 40/56

* cited by examiner

*Primary Examiner* — Katherine Lin
(74) *Attorney, Agent, or Firm* — CHIP LAW GROUP

(57) ABSTRACT

A computer-implemented method includes obtaining at least one metric from a framework processing large-scale data, generating at least one prompt from the at least one metric, providing the at least one prompt to a selected large language model (LLM), the LLM being trained with data related to the framework, converting a recommendation from the LLM into a first configuration for the framework, forming a second configuration by applying at least one guiderail to the first configuration, applying the second configuration to the framework for processing a first data processing job, evaluating a cause of failure of the first data processing job, automatically adjusting, based on the cause of failure, the second configuration to form a third configuration, and apply the third configuration to the framework for processing a second data processing job, the second data processing job being a resubmitted first data processing job.

19 Claims, 6 Drawing Sheets

500

Obtain at least one metric from a framework processing large-scale data 510

Generate at least one prompt from the collected at least one metric 520

Provide the at least one prompt to a selected large language model (LLM), the LLM being trained with data related to the framework 530

Convert a recommendation from the LLM into a first configuration for the framework 540

Form a second configuration by applying at least one guiderail to the first configuration 550

Apply the second configuration to the framework for processing a first data processing job 560

Evaluate a cause of failure of the first data processing job 570 automatically adjust, based on the cause of failure, the second configuration to form a third configuration 580

Apply the third configuration to the framework for processing a second data processing job, the second data processing job being a resubmitted first data processing job 590

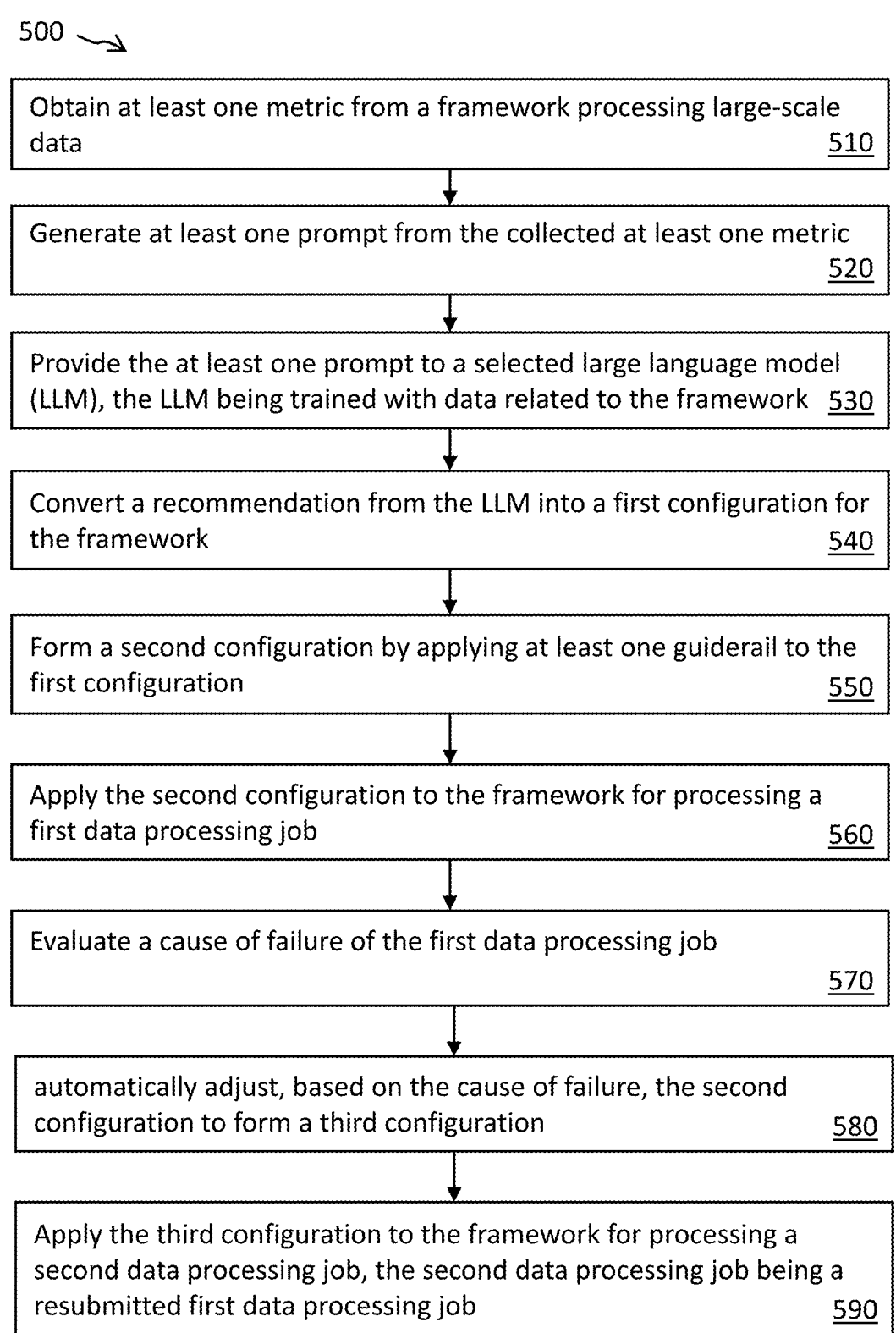

500

| Obtain at least one metric from a framework processing large-scale data       510 |
| :--- |

| Generate at least one prompt from the collected at least one metric       520 |
| :--- |

| Provide the at least one prompt to a selected large language model (LLM), the LLM being trained with data related to the framework   530 |
| :--- |

| Convert a recommendation from the LLM into a first configuration for the framework       540 |
| :--- |

| Form a second configuration by applying at least one guiderail to the first configuration       550 |
| :--- |

| Apply the second configuration to the framework for processing a first data processing job       560 |
| :--- |

| Evaluate a cause of failure of the first data processing job       570 |
| :--- |

| automatically adjust, based on the cause of failure, the second configuration to form a third configuration       580 |
| :--- |

| Apply the third configuration to the framework for processing a second data processing job, the second data processing job being a resubmitted first data processing job       590 |
| :--- |

FIG. 5

COMPUTER-BASED SYSTEMS CONFIGURED FOR OPTIMIZING COMPUTING RESOURCE(S) AND METHODS OF USE THEREOF

FIELD OF TECHNOLOGY

The present disclosure generally relates to the field of large-scale data processing, large-scale data analytics, and/or optimizing computing resource(s) for big data processing and/or analytics.

BACKGROUND OF TECHNOLOGY

Typically, the term "large-scale data" may encompass massive datasets in various formats, including, but not limited to, structured, semi-structured and/or unstructured data. Typically, a complexity of large-scale data may demand data approaches, such as, but not limited to, machine learning, data mining and/or data visualization, to output meaningful insight(s) and/or perform action(s). Typically, a sheer volume of big data may utilize distributed processing systems to handle the data efficiently at scale.

SUMMARY OF DESCRIBED SUBJECT MATTER

In some aspects, the techniques described herein relate to a computer-implemented method including: obtaining, by a computing device, at least one metric from a framework processing large-scale data; generating, by the computing device, at least one prompt from the at least one metric; providing, by the computing device, the at least one prompt to a selected large language model (LLM), the LLM being trained with data related to the framework; converting, by the computing device, a recommendation from the LLM into a first configuration for the framework; forming, by the computing device, a second configuration by applying at least one guiderail to the first configuration; applying, by the computing device, the second configuration to the framework for processing a first data processing job; evaluating, by the computing device, a cause of failure of the first data processing job; automatically adjusting, by the computing device based on the cause of failure, the second configuration to form a third configuration; and applying, by the computing device, the third configuration to the framework for processing a second data processing job, the second data processing job being a resubmitted first data processing job.

In some aspects, the techniques described herein relate to a method, further including storing, by the computing device, the second configuration in a centralized management unit allowing the second configuration to be accessed across different domains, applications or systems.

In some aspects, the techniques described herein relate to a method, where the centralized management unit performs job signature matching including categorizing data processing jobs based on input size thereof or clustering resource availability and previous job success and/or failure.

In some aspects, the techniques described herein relate to a method, where generating the at least one prompt includes referencing at least one guideline for the framework.

In some aspects, the techniques described herein relate to a method, where the at least one guideline includes information on memory management, partition sizing or both.

In some aspects, the techniques described herein relate to a method, where generating the at least one prompt includes referencing at least one past job event.

In some aspects, the techniques described herein relate to a method, where the trained LLM is trained with data obtained from one or more sources including at least one of: at least one best practice configuration related to the framework, at least one instruction documentation related to the framework, at least one past optimization related to the framework, or any combination thereof.

In some aspects, the techniques described herein relate to a method, where the best practices include curated guidelines for optimizing the framework.

In some aspects, the techniques described herein relate to a method, where the documentations include information on diagnosing and fixing at least one bottleneck of the framework.

In some aspects, the techniques described herein relate to a method, where the past optimizations include at least one tuning example that demonstrate how specific configurations affect runtime and resource usage of the framework.

In some aspects, the techniques described herein relate to a method, further including checking, by the computing device, with an iteration limiter before resubmitting the first data processing job.

In some aspects, the techniques described herein relate to a method, where the framework is Apache Spark.

In some aspects, the techniques described herein relate to a method, where the first, second or third configuration includes at least one of an application setting, an environment variable, a logging configuration, a cluster manager, a dynamic allocation of a number of executors or a session configuration.

In some aspects, the techniques described herein relate to a method, where the at least one metric includes CPU usage, memory usage, ephemeral storage statistics, job execution time or cost data.

In some aspects, the techniques described herein relate to a method, where the guiderail includes a cost or a performance threshold.

In some aspects, the techniques described herein relate to a system, including: one or more processors; and a memory in communication with the one or more processors and storing instructions that, when executed by the one or more processors, cause the one or more processors to: obtain at least one metric from a framework processing large-scale data; generate at least one prompt from the at least one metric; provide the at least one prompt to a selected large language model (LLM), the LLM being trained with data related to the framework; convert a recommendation from the LLM into a first configuration for the framework; form a second configuration by applying at least one guiderail to the first configuration; apply the second configuration to the framework for processing a first data processing job; evaluate a cause of failure of the first data processing job; automatically adjust, based on the cause of failure, the second configuration to form a third configuration; and apply the third configuration to the framework for processing a second data processing job, the second data processing job being a resubmitted first data processing job.

In some aspects, the techniques described herein relate to a system, further including a centralized management unit configured to store the second configuration to be accessed across different domains, applications or systems.

In some aspects, the techniques described herein relate to a system, where the centralized management unit performs job signature matching including categorizing data processing jobs based on input size thereof or clustering resource availability and previous job success and/or failure.

In some aspects, the techniques described herein relate to a system, where the trained LLM is trained with data obtained from one or more sources including at least one of: at least one best practice configuration related to the framework, at least one instruction documentation related to the framework, at least one past optimization related to the framework, or any combination thereof.

In some aspects, the techniques described herein relate to a system, further including an iteration limiter where the one or more processors are caused to check with the iteration limiter before resubmitting the first data processing job.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 is a flowchart illustrating an exemplary optimization process for framework configuration in accordance with one or more embodiments of the present disclosure.

DETAILED DESCRIPTION

Figure 1:
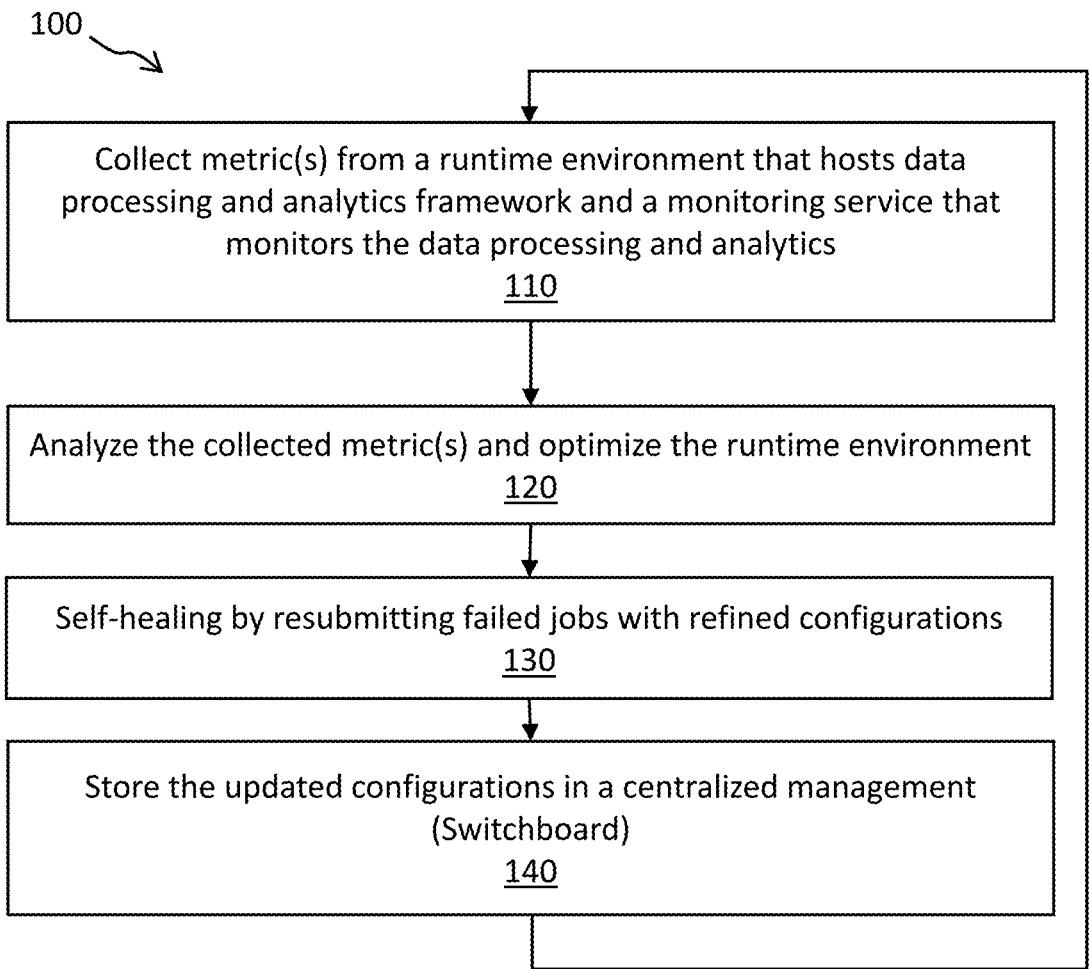
FIG. 1 is a block diagram illustrating an architecture of an exemplary framework configuration optimization system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in at least some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In at least some embodiments, various computer-based systems and/or computer-based methods described herein may be configured to support execution of one or more analytics application on big data, utilizing one or more virtual machines and/or containers that may be first provisioned in an exemplary cloud computing system. In at least some embodiments, various computer-based systems and/or computer-based methods described herein may be configured to utilize a distributed processing framework, such as, for example, Spark™ or Hadoop™ both from Apache Software Foundation in Wilmington, DE, that may be deployed on one or more virtual machines and/or one or more containers. In at least some embodiments, various computer-based systems and/or computer-based methods described herein may be configured to allow data at least one analytics application to run on top of a distributed processing framework. In at least some embodiments, an exemplary distributed data processing framework may be configured with various parameters including computer memory, CPU shuffle setting(s) and/or executor count(s). In at least some embodiments, such exemplary parameters may impact a performance of the data analytics application, cost of cloud service(s), developer time, achieving service level agreement(s) (SLA(s)), and/or other associate parameter(s).

In at least some embodiments, various computer-based systems and/or computer-based methods described herein may be configured to improve organizations that may rely on the distributed processing frameworks for analytics and processing large-scale data. For example, one illustrative technological problem may be a need to find a personalized configuration for a particular distributed processing framework. For example, incorrect resource sizing may lead to wasted compute and overpayment; manual, trial-and-error tuning of the parameter may be tedious and error-prone, diverting skilled engineers from other tasks; suboptimal resource allocation may cause job failures and delays, often leading to missed deadlines; tuning thousands of data processing and analytics jobs manually or in bulk is not feasible without automation; and without a unified perspective on cost, usage and job status, valuable insights and improvements may be lost. The "job" as used herein in data processing generally refers to a task or a series of tasks designed to manipulate, transform, or analyze data to extract useful information or insights. Data processing jobs can involve various operations such as cleaning, aggregating, filtering, sorting, and joining data from different sources.

In at least some embodiments, various computer-based systems and/or computer-based methods described herein may be configured to address at least one non-limiting technical problem of inefficient computing resource utilization (e.g., long execution time, network data clogging, etc.) for big data processing and/or big data analytics. In at least some embodiments, various computer-based systems and/or computer-based methods described herein may be configured to provide at least one non-limiting technical solution problem that utilizes at least one generative artificial intelligence (AI) model trained for optimizing computing resource utilization/configuration for large-scale data processing and/or analytics. In at least some embodiments, an exemplary optimization system collects, analyze and/or optimize metric(s) from an exemplary data processing framework and at least one monitoring service. In at least some embodiments, such metric(s) may include CPU/memory usage, ephemeral storage statistics job execution, cost data, or any combination thereof. In at least some embodiments, an exemplary optimization system may utilize an optimized framework configuration for a given data processing and/or analytics job. In at least some embodiments, various optimization systems configured in accordance with one or more principles of the present disclosure may be configured to self-heal based, at least in part, one or more failed jobs by automatically resubmitting one or more failed jobs with at least one refined configuration, so that a repeated downtime can be prevented.

In at least some embodiments, the optimization system may include one or more generative AI agents for tuning (e.g., adjusting configuration), for instance, jobs for an illustrative analytics framework designed for large-scale data processing (may be referenced herein also as "a large-scale data processing framework/engine"), such as, without limitation, Apache Spark jobs on Amazon Web Services (AWS) Elastic MapReduce (EMR) Serverless, and may be also adaptable to other Spark runtimes, or any other similarly suitable runtimes. In at least some embodiments, an exemplary large-scale data processing framework/engine in accordance with one or more principles of the present disclosure may be configured to process data in-memory, which may make such processing to be faster than disk-based processing frameworks like, without limitation, Hadoop MapReduce. In at least some embodiments, an exemplary large-scale data processing framework/engine in accordance with one or more principles of the present disclosure may be configured to support multiple programming languages, including, without limitation, Python, SQL, Scala, Java, and R, making the exemplary large-scale data processing framework/engine to be accessible to a wide range of developers. In at least some embodiments, an exemplary large-scale data processing engine in accordance with one or more principles of the present disclosure may be configured to provide built-in libraries for SQL queries, streaming data, machine learning, and/or graph processing. In at least some embodiments, an exemplary large-scale data processing framework/engine in accordance with one or more principles of the present disclosure may be configured to handle large-scale data processing tasks across clusters of computers. In at least some embodiments, an exemplary large-scale data processing engine in accordance with one or more principles of the present disclosure may be configured to perform batch processing, real-time streaming, and/or interactive queries, all within a single framework.

In at least some embodiments, an exemplary large-scale data processing engine in accordance with one or more principles of the present disclosure may be configured based at least in part various properties to optimize performance and tailor a particular environment to specific need(s). In at least some embodiments, an exemplary large-scale data processing engine in accordance with one or more principles of the present disclosure may be configured based to at least in part on one or more of the following aspects/properties.

A first non-limiting aspect may be a configuration that may allow one or more properties of the exemplary large-scale data processing engine to control at least one or all application settings. For example, if the exemplary large-scale data processing engine may be based on Apache Spark and may utilize a specialized SparkConf object and/or through Java system properties. In at least some embodiments, at least one or more reconfigurable properties may include, without limitation, a master URL, application name(s) and/or executor memory. For example, a master URL property may specify the cluster manager (e.g., "local" for local mode with two cores). For example, the application name(s) property may set the name of an example Spark application. For example, the executor memory may define the amount of memory allocated to each executor (e.g., spark.executor.memory).

A second non-limiting aspect is of environment variables which can be used to set per-machine settings, such as IP addresses, through the conf/spark-env.sh script on each node.

A third non-limiting aspect is about logging configuration. Logging can be configured through log4j2.properties to manage the logging behavior of Spark applications.

A fourth non-limiting aspect is about cluster managers. Spark can support various cluster managers, including YARN, Mesos, Kubernetes, and standalone mode. Configuration for these managers can be set in the respective cluster manager's configuration files.

A fifth non-limiting aspect is dynamic allocation which allows Spark to dynamically adjust the number of executors based on the workload, optimizing resource usage.

A sixth non-limiting aspect is Spark session configuration in PySpark which is the Python API for Apache Spark. In PySpark, one can configure Spark properties using the SparkConf class and pass it to the SparkSession builder. For example, spark=SparkSession.builder.config (conf=conf).geOrCreate( ).

A seventh non-limiting aspect is Databricks configuration. On Databricks, one can set Spark properties using the user interface (UI) or JavaScript™ Object Notation (JSON), and configure them for serverless notebooks and jobs.

In at least some embodiments, by integrating observability services and orchestrating the workflow of data processing and/or analytics, the optimization system can repeatedly analyze job performance, cost and reliability.

In at least some embodiments, the optimization system may employ a large language model (LLM) to provide optimized framework configurations that comply with user defined guardrail(s), such as maximum cost and/or job duration. Eventually, the optimization system updates and centralizes improved framework configuration in a centralized configuration management service (like a switchboard) to ensure streamlined, consistent, and easily reproducible data processing and analytics jobs across the organization.

FIG. 1 is a block diagram illustrating an architecture of an exemplary framework configuration optimization system 100 in accordance with one or more embodiments of the present disclosure. The optimization system 100 may include blocks 110-140 as described herein below.

In block 110, in at least some embodiments, the optimization system 100 collects metric(s) from a runtime environment that hosts data processing and/or analytics framework and a monitoring service that monitors the data processing and/or analytics. In at least some embodiments, the collected metric(s) may include CPU/memory usage, ephemeral storage statistics, job execution time, and cost data. In at least some embodiments, the runtime environment may be the AWS EMR Serverless; the data processing and analytics framework may be Apache Spark; and the monitoring service may be AWS CloudWatch.

In block 110, in at least some embodiments, the optimization system 100 additionally fetches event logs from the data processing and/or analytics framework to gain deeper performance insight(s), such as task-level memory spill(s), shuffle overhead(s), and repeated failure pattern(s).

In block 120, in at least some embodiments, the optimization system 100 analyzes the collected metric(s) and optimizes the runtime environment by, for example, feeding the collected metric(s) into a large-language model (LLM) which can suggest new framework configuration parameters. In at least some embodiments, the LLM may be trained with dataset from new metric(s) ensuring continuous improvement over multiple runs.

In at least some embodiments, the block 120 may include historical data analysis as job metrics are logged and stored over time in, for example, CloudWatch™ (from Amazon in Seattle, WA), S3™ (from Amazon in Seattle, WA), XCom of Apache Airflow™ (from Apache Software Foundation in Wilmington, DE), (also herein below as "Airflow"), etc., The job metrics exemplarily include execution time, resource utilization, failure patterns and shuffle behavior.

In at least some embodiments, the block 120 includes analyzing past job runs to detect recurring inefficiencies, e.g., frequent-out-of memory (OOM) issues. By using historical context to recommend better configuration instead of re-learning every time, the optimization system 100 is a trend-based optimization.

In at least some embodiments, the collected metric(s) are fed via a centralized platform to various LLMs. The centralized platform developed as a content as a service (CaaS) that provides a unified application programming interface (API) for the various LLMs. In at least some embodiments, the centralized platform provides centralized access and/or abstractions to alleviate performance and/or availability concerns by providing guidance and optimization(s) for LLM usage. The centralized platform also helps to ensure that all teams can leverage LLMs without worrying about infrastructure and/or vendor-specific detail(s).

In at least some embodiments, the centralized platform allows centralized learning by aggregating insights from different teams and/or projects to share learning(s) and best practice(s). The centralized platform can avoids siloed experiments by providing a single point of interaction with multiple LLM providers.

In at least some embodiments, the centralized platform can provide centralized security by eliminating the need for individual team(s) to manage API key(s). The centralized platform can provide centralized privacy by handling privacy compliance, reducing legal and/or regulatory complexities for each project.

In at least some embodiments, the centralized platform can be provider-agnostic by maintaining consistent interface(s), making it easier to switch or add new LLM provider(s) as technology evolves.

In at least some embodiments, the centralized platform can provide centralized billing by managing contract(s) and billing behind the scene so developers can focus on building solution(s).

As an example, the centralized platform specifies the use of OpenAI's GPT 4-o1 model (from OpenAI in San Francisco, CA) for its strong coding and reasoning capabilities. This model can process prompt(s) containing framework job metric(s) and good practices, and return optimized configuration(s) or tuning suggestions.

In at least some embodiments, the optimization system 100 applies strict guardrail(s) to the suggested framework configuration parameter(s), so that each iteration stays within budgetary or SLA threshold(s). For example, the optimization system 100 applies maximum cost in dollar and/or maximum runtime in minutes as the guardrails.

In block 130, in at least some embodiments, the optimization system 100 automatically resubmits failed job(s) with re-tuned configurations to prevent repeated downtime and avoiding missed SLA(s).

In block 140, in at least some embodiments, each updated framework configuration are stored in a centralized management unit which can function as a switchboard. All subsequent runs can use the improved configuration(s) to maintain consistency across multiple jobs, directed acyclic graphs (DAGs) or projects. In at least some embodiments, the DAG can be used in workflow orchestration tools like Apache Airflow™. The Airflow™ uses DAGs to define a sequence of tasks that need to be executed, specifying dependencies and execution order. This helps to ensure task(s) are run in the correct sequence without cycle(s), preventing infinite loop(s). For example, a DAG in the Airflow™ may define task(s) for data extraction, transformation, and loading (ETL) processes, helping to ensure each step is completed before the next begins.

In at least some embodiments, the centralized management unit may include job signature matching. For example, jobs are categorized based on input size, cluster resource availability and previous job success/failure. Therefore, centralized management unit helps to ensure that similar jobs use similar optimized settings.

In at least some embodiments, the centralized management unit or switchboard maintains consistency by ensuring repeatable job performance despite variable input(s), and by enforcing uniform optimized practice(s) across teams and pipelines. Quantifiable metric(s) for consistency includes job runtime stability, failure rate reduction, cost efficiency, and configuration reusability. In embodiments, the job runtime stability refers to that job execution time remains within 5-10% variance. In at least some embodiments, the failure rate reduction refers to that the failed job resubmissions decrease over time. In at least some embodiments, the cost efficiency refers to that resource utilization remains optimized while preventing cost spikes. In at least some embodiments, the configuration reusability refers to that similar jobs use pre-tuned configurations instead of relearning configurations.

As shown in FIG. 1, in at least some embodiments, the optimization system 100 reiterates the blocks 110-140 in a predetermined time interval or after completing a new data processing job.

In at least some embodiments, the optimization system 100 speeds up data processing by aligning resource(s) and concurrency level(s) with actual workload demand(s). The optimization system 100 can dynamically reduce CPU and memory overhead, eliminating the tendency to overspend on idle resources. The optimization system 100 can also free developers from repetitive tasks, enabling them to focus on strategic engineering work. The optimization system 100 can then decrease job failure rates by adjusting resource allocation automatically when threshold are exceeded or frequent out of memories (OOMs) occur.

Figure 2:
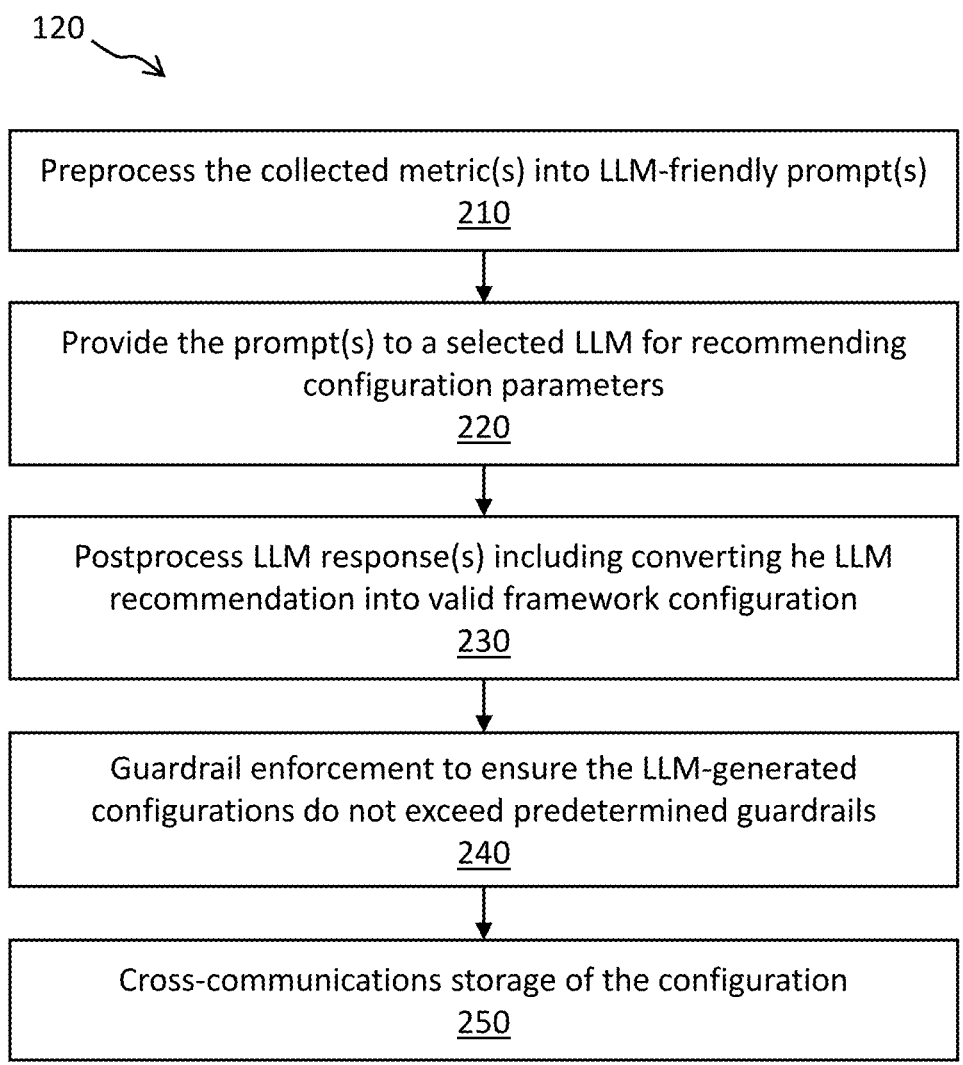
FIG. 2 is a flowchart illustrating an exemplary implementation of the analysis and optimization block shown in FIG. 1.

FIG. 2 is a flowchart illustrating an exemplary implementation of the analysis and optimization block 120 shown in FIG. 1. The exemplary implementation begins with preprocessing the collected metric(s) into LLM-friendly prompt(s)

in block 210. For example, log(s) stored in AWS Cloud-Watch and S3 may be converted into structured input(s) for the LLM.

In a next block 220, in at least some embodiments, the prompt(s) are provided to a selected LLM for generating framework configuration recommendation(s). In at least some embodiments, selecting a LLM involves several non-limiting considerations: purpose and use case, model size and complexity, training data, fine-tuning and performance metric(s). According to embodiments of the present disclosure, the LLM is used for recommending configuration parameter(s), thus is text-based generation. Larger models like GPT-4 or Google's LaMDA tend to perform better on complex tasks but require more computational resources. Models trained on diverse datasets can generalize with a better performance for various tasks. As the optimization system 100 requires fine-tuning for recommending configuration parameter(s), model(s) that can be fine-tuned is preferred. Performance metric(s), such as accuracy, F1 score, or Bilingual Evaluation Understudy (BLEU) score, are used to evaluate the model's performance for the specific recommending tasks.

In block 230, in at least some embodiments, response(s) from the LLM are postprocessed, including converting the LLM recommendation(s) into valid framework configuration(s).

In a next block 240, in at least some embodiments, the valid framework configuration(s) are processed by a guardrail enforcement layer to ensure that the LLM-generated configurations do not exceed, for instance, cost thresholds and maintain job stability (e.g., preventing too many executors leading to overhead). In at least some embodiments, applying guardrail(s) may prevent over-allocation of resources, keep costs under control, and maintain stable performance. The guardrail(s) can also act as a safety net for the LLM's suggestion(s)—any recommendation(s) exceeding the guardrail(s) are either adjusted or rejected to ensure system reliability.

In at least some embodiments, a guardrail is determined from existing jobs. For example, the optimization system 100 may fetch, using AWS Elasticsearch Dashboards™ from Amazon in Seattle, WA, an average cost per day for jobs form the last 5 days. This average may help set cost and performance thresholds so that the LLM's recommendations may stay within acceptable limits.

In at least some embodiments, the guardrail is determined from new job(s). For example, user(s) can manually provide guardrails (e.g., max memory and cost constraints). Alternatively, once the new job has 5 successful runs in different days, the optimization system 100 calculates an average cost/performance from these runs and uses the average as a baseline guardrail going forward.

In a next block 250, in at least some embodiments, the framework configuration(s) are stored in a cross-communications storage to ensure that framework configurations from multiple iterations are stored and refined. In at least some embodiments, the cross-communication storage allows data to be shared and accessed across different domains, applications, or systems.

Figure 3:
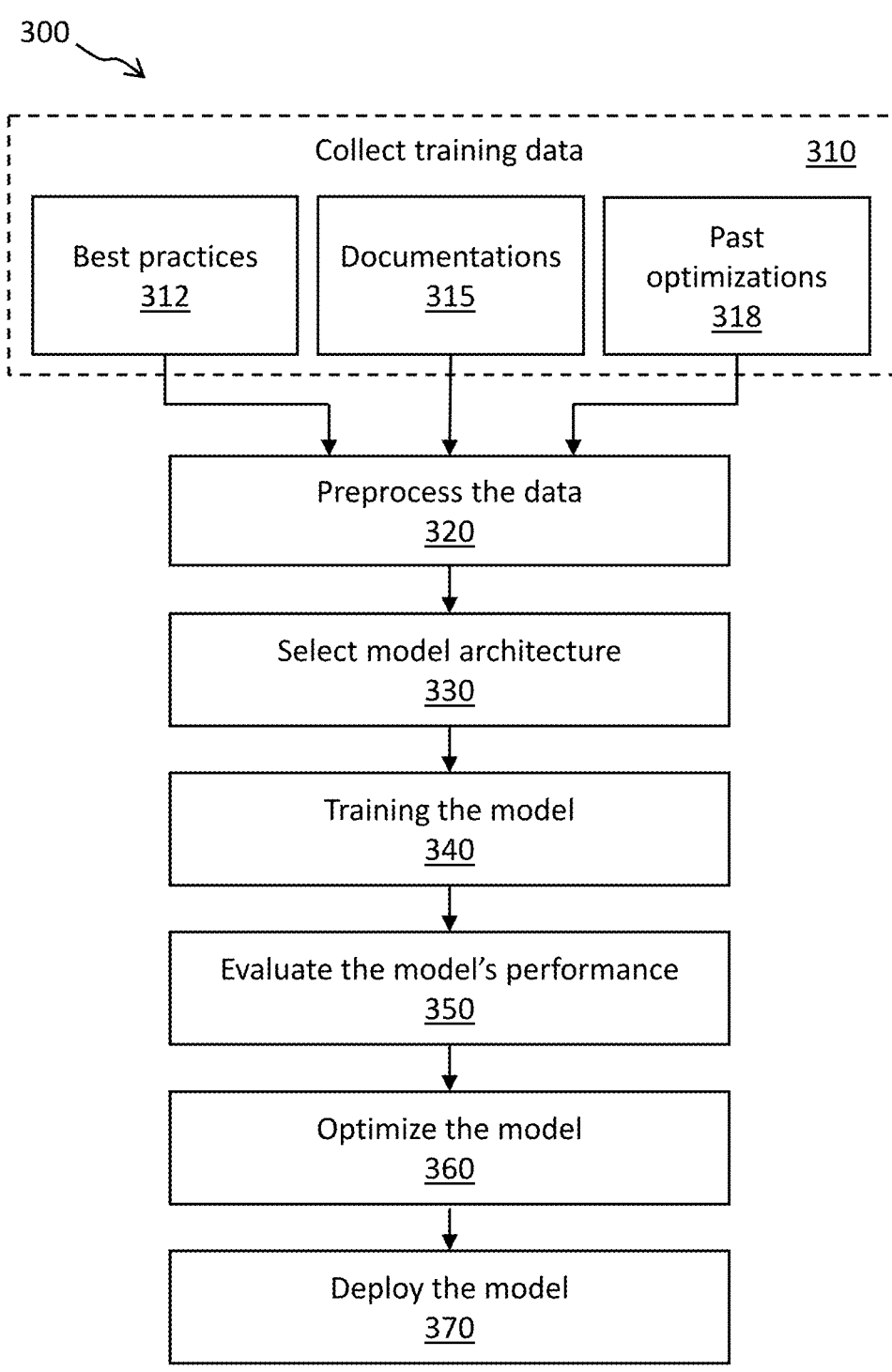
FIG. 3 is a flowchart illustrating a domain-specific large-language model training process in accordance with one or more embodiments of the present disclosure.

FIG. 3 is a flowchart illustrating a domain-specific LLM training process 300 in accordance with one or more embodiments of the present disclosure. The LLM training process 300 includes blocks 310-370 as described herein below.

In block 310, in at least some embodiments, training data are collected from various sources that are relevant to the task(s) the LLM will perform. Such sources exemplarily include best practice(s) 312, documentation 315 and past optimization(s) 318 all pertaining to the framework. In at least some embodiments, the best practices 312 include curated guideline(s) for the framework optimization in aspects, for example, memory management, partition sizing. The documentation(s) 315 include technical articles and deep-dive resources on diagnosing and fixing common framework bottleneck(s). The past optimization(s) 318 include actual job log(s), performance metric(s), and tuning example(s) that demonstrate how specific configurations affect runtime and resource usage of the framework.

In block 320, in at least some embodiments, the collected training data are cleaned and preprocessed (e.g., removing duplicates, handling missing values) to form both raining datasets and validation datasets. In at least some embodiments, the text data are tokenized into manageable units.

In block 330, a in at least some embodiments, a propriate LLM architecture (e.g., GPT or BERT) is selected. Then the selected LLM's parameters and layers are configured. In at least some embodiments, a pre-trained foundation LLM is selected and then undergoes domain-specific fine-tuning with the above collected data.

In block 340, in at least some embodiments, the selected LLM undergoes a training process which includes initializing the model with pre-trained weights (if available); training the model with the prepared dataset; and monitoring training metric(s) (e.g., loss, accuracy).

In block 350, in at least some embodiments, the model's performance is evaluated on a validation dataset. The model is then fine-tuned based on the evaluation results.

In block 360, in at least some embodiments, the model can be optimized for efficiency and performance by implement techniques like pruning or quantization if necessary.

In block 370, in at least some embodiments, the trained model is then deployed to a production environment for suggesting framework configuration. Performance of the trained model is monitored and updated with new data.

in at least some embodiments, the specialized training process 300 helps the LLM deliver relevant, context-aware recommendations tailored to improving the framework (e.g., Spark™) performance in real-world scenarios.

Figure 4:
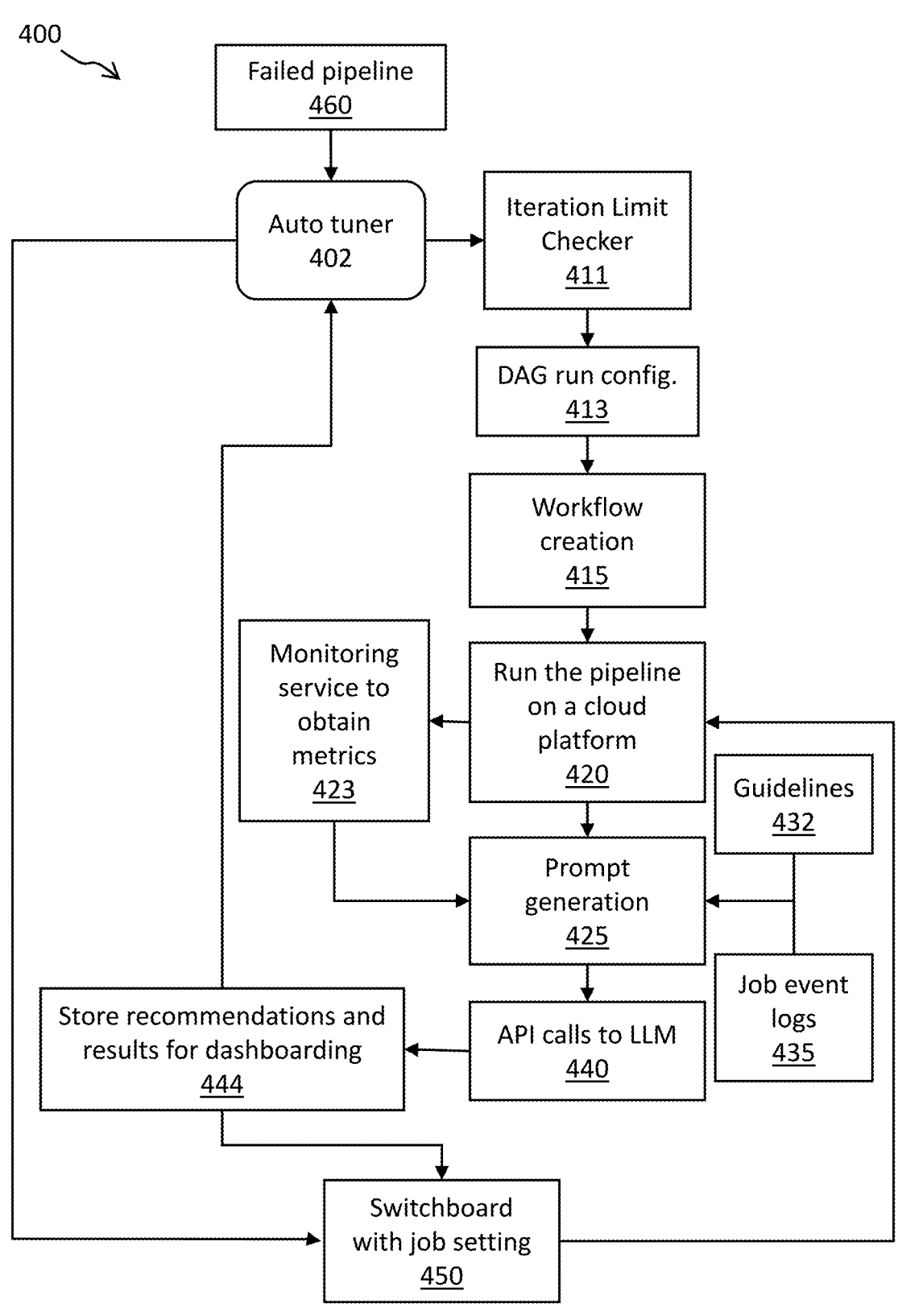
FIG. 4 is a block diagram illustrating a workflow of a framework configuration optimization system in accordance with one or more embodiments of the present disclosure.

FIG. 4 is a block diagram illustrating a workflow 400 of a framework configuration optimization system 100 in accordance with one or more embodiments of the present disclosure. in at least some embodiments, the workflow 400 exemplarily includes an auto tuner 402 that evaluates failure reasons of a failed pipeline 460 and provides corrected framework configuration(s) for resubmitting a job from the failed pipeline 460. In at least some embodiments, the workflow 400 includes extracting failure logs from, for example, CloudWatch and/or S3 of AWS, identifying root cause, e.g., out of memory (OOM), executor death, and/or timeout. In at least some embodiments, the LLM at block 440 are queried to re-evaluate the configuration considering reasons of the job failure, and what needs to be adjusted, e.g., increasing memory vs. reduce partitions.

In at least some embodiments, a Smart Spark auto tuner 402 is a componentized, Airflow-orchestrated system designed to iteratively optimize Spark job configurations based on job telemetry and LLM-generated recommendations. The Smart Spark auto tuner 402 is triggered either manually or automatically via ZDNI and executes a multi-stage optimization loop.

An exemplary architecture of the Smart Spark auto tuner 402 includes:

Trigger Source: Smart Spark DAG is invoked either manually or via ZDNI DAG. The Smart Spark DAG promotes best config to main_spark_config on success.

Config Layer: Uses Switchboard to manage per-job configurations (main_spark_config, tmp_spark_config, tuning_mode, zdni_triggered, guardrails, max_iterations).

Execution Layer: Submits Spark jobs on AWS EMR Serverless.

Monitoring Layer: Gathers metrics from CloudWatch and Spark event logs.

LLM Agent: Uses a CaaS API (LLM-backed) to generate new configurations.

Storage Layer: Stores results in Elasticsearch and Switchboard.

Communication: Posts detailed Slack notifications (cost/duration savings, config deltas).

In at least some embodiments, the Smart Spart auto tuner 402 performs following functions:

1. Switchboard Setup

Fetches config using (app_id, setting_id).

Enables tuning_mode=true, copies main_spark_config→tmp_spark_config.

Injects zdni_triggered based on caller.

Defaults: max_iterations=5, guardrails={"avg_cost": 10, "avg_job_duration_seconds": 60}.

2. Iteration Loop (Per Job)

Triggers target DAG and job with tmp_spark_config.

Skips unrelated tasks using Airflow task manipulation.

Monitors job execution state (RUNNING, FAILED, SUCCESS) using Airflow+EMR APIs.

Extracts:

Job cost: vCPU, memory, and storage billing.

Execution duration.

CloudWatch metrics (task retries, memory spill, shuffle read/write).

Sends this as a structured prompt to the CaaS (LLM) for config suggestions.

3. LLM Recommendation & Guardrails

Merges LLM output into tmp_spark_config (if iteration is not final). For example, a LLM tuner iteratively updates tmp_spark_config.

Enforces guardrails: rejects or adjusts config if it exceeds max cost or duration thresholds.

4. Result Evaluation & Promotion

Tracks best config across all iterations (lowest cost/duration).

On success:

Promotes best config to main_spark_config (auto for ZDNI-triggered, manual otherwise).

Posts summary to Slack.

Updates Elasticsearch.

On failure:

Posts detailed debug summary (cost spikes, config deltas).

Resets tuning_mode and zdni_triggered.

In at least some embodiments, the zdni_triggered determines scope of promotion (stage-only vs. stage+Prod).

As shown in FIG. 4, in at least some embodiments, an output from the auto tuner 402 may be provided to an iteration limit checker 411 which ensures that the resubmitted job does not exceed a predetermined iteration limit. As the configuration optimization or refinement is iterative, if failure persists, the iteration limit is checked. If tuning does not converge, a need for manual intervention may be flagged.

In at least some embodiments, if the resubmitted job falls within the iteration limit, it will be forwarded to a DAG run configuration module 413 which determines setting(s) and parameter(s) used to execute a DAG in the workflow 400. A DAG run is an instance of the DAG being executed at a specific point in time. Each time the DAG is triggered, a DAG run is created, and all tasks within the DAG are executed based on the defined dependencies and schedule.

As shown in FIG. 4, in at least some embodiments, output of the DAG run configuration module 413 is provided to workflow creation platform 415 which programmatically author, schedule, and monitor workflows as DAGs. Apache Airflow is an example of the workflow creation platform 415. To trigger a DAG, an API method may exemplarily be used by sending a POST request to an API endpoint of the platform 415: POST /api/experimental/dags/<dag_id>/dag_runs.

In at least some embodiments, the workflow creation platform 415 dynamically generate pipelines defined in Python programming language. An example of building a pipeline may include a setup, initializing database, creating connection(s) and defining task(s). The setup may involve installing Docker and download the docker-compose.yaml file. Docker Compose may be used to initialize database by setting up, for example, an Airflow environment. Connections to the initialized database may be set up via, for example, the Airflow web UI. Tasks for the pipeline can be defined by using operators like PostgresOperator™ from Zalando.

As another example, creating a pipeline in PySpark™ (from Databricks in San Francisco, CA) involves chaining multiple stages, each of which can be either an estimator or a transformer. This allows for building complex workflows for data processing and machine learning. Key components for a PySpark™ pipeline may include dataframe, transformer, estimator and pipeline. In at least some embodiments, the dataframe refers to the dataset used in the pipeline, which can hold various data types. The transformer refers to an algorithm that transforms one dataframe into another. For example, a model that makes predictions. The estimator refers to an algorithm that can be fit on a data frame to produce a transformer. For example, a learning algorithm that trains a model. The pipeline refers to chains multiple transformers and estimators together to define the workflow.

As shown in FIG. 4, a triggered pipeline can run on a designated cloud platform in block 420. As an example, the pipeline may be a PySpark pipeline; and the cloud platform may be an AWS EMR Serverless.

As shown in FIG. 4, in at least some embodiments, a monitoring service 423, such as AWS CloudWatch, may obtain metric(s) from the cloud platform 420 running the pipeline. As an example, the metric(s) may include CPU/memory usage, ephemeral storage statistics job execution and cost data.

As shown in FIG. 4, in at least some embodiments, the metric(s) from the monitoring service 423, guidelines 432 and job event logs 435 are provided to a prompt generation module 425 as references to generate tailored prompts for LLMs (prompt engineering). As an example, the guidelines 432 include curated framework optimization guidelines, e.g., memory management and partition sizing. The job event logs 435 include performance metrics, tuning examples that demonstrate how specific configurations affect runtime and resource usage from past optimizations.

In at least some embodiments, the LLM prompt engineering and/or optimization customize logic to format job metric(s) into optimal LLM prompt(s), ensure meaningful recommendation instead of generic answer(s), and apply domain-specific constraints to the LLM's response(s).

As shown in FIG. 4, in at least some embodiments, the tailored prompt is provided to a trained LLM for generating configuration recommendation(s) via API calls in block 440. In at least some embodiments, the recommendation(s) from the trained LLM are stored in, e.g., ElasticSearch, for dashboarding in block 444. ElasticSearch™ refers to an open-source search and analytics engine built on Apache Lucene™. It is designed to handle large volumes of data and provide fast, scalable search capabilities. The dashboarding refers to the process of creating and using dashboard(s) to visualize and monitor key metric(s), data, and performance indicators. Dashboards provide a consolidated view of data, often in real-time, making it easier to understand and analyze complex information quickly.

As shown in FIG. 4, in at least some embodiments, the recommendation(s) from the trained LLM are provided to the auto tuner 402 from the block 444. The auto tuner 402 uses the recommendations as a baseline and/or reference for configuring the framework for processing incoming jobs.

As shown in FIG. 4, in at least some embodiments, the LLM recommendation(s) are converted to framework configurations, and provided to a switchboard with job setting(s) in block 450. The switchboard 450 may provide centralized management to ensure streamlined, consistent, and easily reproducible data processing and/or analytics jobs across the organization. In at least some embodiments, the switchboard determines the right configuration based on following factors (using Spark™ as an exemplary framework):

Tuning Mode Status (tuning_mode=True/False)
If enabled, exemplary SmartSpark selects tmp_spark_config.
Otherwise, it picks main_spark_config.
ZDNI-Triggered (zdni_triggered=True/False)
If ZDNI-triggered, updates both Stage & Prod.
Otherwise, updates only the current environment.
Job Type & History
Jobs are mapped to their previous best configurations.

As a non-limiting example, the term, ZDNI, stands for Zero Defects North Star Initiative, a GoDaddy-wide data reliability framework designed to proactively identify, alert, and remediate critical failures in Tier-1 (T1) data systems. The initiative is focused on minimizing Mean Time to Recovery (MTTR) and progressing toward a state of zero operational defects in the data platform. In at least some embodiments, the ZDNI includes a ZDNI collector DAG, smart alerting and ticketing, an auto-tuning trigger via zdni_triggered flag and an early-warning system.

Exemplary impact of zdni_triggered includes:
If zdni_triggered: true, and tuning_mode: true, the job will:
Tune in Stage.
On success, auto-promote the config to both Stage and Prod.
If zdni_triggered: false, only the environment where the job ran (e.g., Stage) will be updated.

As an example, the ZDNI collector DAG includes an Airflow DAG that runs periodically in the MWAA environment. The ZDNI collector DAG scans recent pipeline runs (Airflow DAGs) for failures or SLA violations, and extracts detailed metadata such as DAG name, failed task name, error reason (e.g., OOM, timeouts), execution environment, and MWAA environment name.

As an example, the smart alerting and ticketing includes posting alerts to Slack channels dynamically based on team ownership; creating ServiceNow (SNOW)™ tickets for incident tracking, using metadata from failure analysis; and allowing Slack-SNOW™ integration to synchronize comments, auto-close tickets, and track recovery actions.

In summary, the ZDNI orchestrates the automated detection, alerting, diagnosis, and recovery workflows across the data platform, tightly integrated with Smart Spark Auto-Tuning, Switchboard configuration control, and ServiceNow™.

In at least some embodiments, the tuning-mode enabled in-target pipeline switchboard settings are provided from the auto tuner 402 to the switchboard 450. In at least some embodiments, the workflow 400 includes an exemplary Python package to authenticate and read from tuning mode, framework configuration and/or guardrails for jobs from the switchboard 450 and override the framework configuration in the cloud platform 420.

In at least some embodiments, the overriding logic includes: (1) a current utility dynamically overrides default job configuration with a Switchboard configuration at runtime; and (2) merging switchboard_spark_config with local defaults, giving precedence to the Switchboard configuration as shown in following program:

```
for config_key in local_defaults:
    spark.config    (config_key,    switchboard_spark_
        config.get (config_key,
    local_defaults [config_key]))
#Add any new keys from Switchboard that aren't in
    local_defaults   for   config_key   in   switchboard_
    spark_config:
    if config_key not in local_defaults:
        spark.config (config_key, switchboard_spark_config
            [config_key])
```

In at least some embodiments, the tuning mode is a behavioral flag in Switchboard (tuning_mode: true/false) that controls how Spark jobs retrieve and apply runtime configurations. Exemplary technical behavior of the tuning mode includes
(1) each job's configuration is stored in Switchboard under an emr_task_name key;
(2) the Spark configuration is selected using the following logic:
```
if tuning_mode:
    use tmp_spark_config
else:
    use main_spark_config
```
(3) the configuration is injected into the Spark session via a shared Phython utility called SparkSessionManager which applies config overrides at job runtime.

In at least some embodiments, the tuning_mode determines which config, main or tmp, is applied.

In at least some embodiments, the workflow 400 can intelligently select framework configurations by dynamically picking the best configuration per job type, per environment (stage/product), and per failure cause. The optimization system 100 aggregates historical data, recognizes patterns and optimizes on learning-basis, so that job metrics and performances are correlated.

In at least some embodiments, different jobs may require different configuration optimizations. For example, for extract, transform, load (ETL) jobs, the optimization may prioritize shuffle optimization and executor memory settings. For machine learning pipelines, the optimizations may optimize parallelism and caching. For ad-hoc queries, the optimization may focus on adaptive execution and cost efficiency.

In at least some embodiments, the framework configuration may be aware of job type by using historical job signatures to identify similar workloads, and ensuring each job type receives an optimized configuration profile.

FIG. 5 is a flowchart illustrating an exemplary optimization process 500 for framework configuration in accordance with one or more embodiments of the present disclosure. The optimization process 500 is exemplarily implemented by at least one computing device, and includes exemplary blocks 510-590 as described hereinbelow.

In block 510, in at least some embodiments, the optimization process 500 obtains at least one metric from a framework processing large-scale data.

In block 520, in at least some embodiments, the optimization process 500 generates at least one prompt from the collected at least one metric.

In block 530, in at least some embodiments, the optimization process 500 provides the at least one prompt to a selected large language model (LLM), the LLM being trained with data related to the framework.

In block 540, in at least some embodiments, the optimization process 500 converts a recommendation from the LLM into a first configuration for the framework.

In block 550, in at least some embodiments, the optimization process 500 forms a second configuration by applying at least one guiderail to the first configuration.

In block 560, in at least some embodiments, the optimization process 500 applies the second configuration to the framework for processing a first data processing job.

In block 570, in at least some embodiments, the optimization process 500 evaluates a cause of failure of the first data processing job.

In block 580, in at least some embodiments, the optimization process 500 automatically adjusts, based on the cause of failure, the second configuration to form a third configuration.

In block 590, in at least some embodiments, the optimization process 500 applies the third configuration to the framework for processing a second data processing job, the second data processing job being a resubmitted first data processing job.

Figure 6:
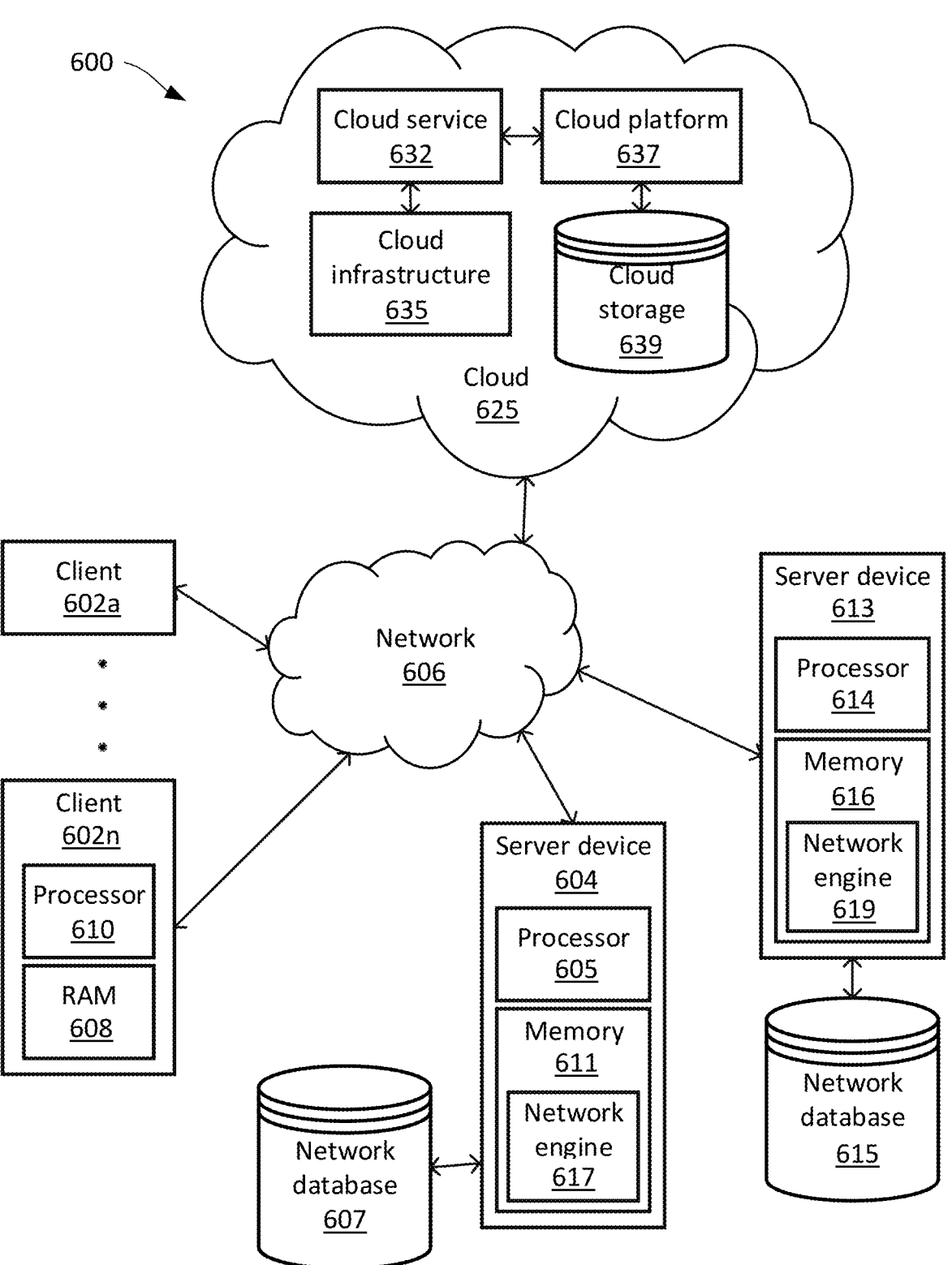
FIG. 6 is a block diagram illustrating an exemplary computer-based system/platform in accordance with one or more embodiments of the present disclosure.

FIG. 6 is a block diagram illustrating an exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, client computing devices 602a through 602n shown each at least includes a computer-readable medium, such as a random-access memory (RAM) 608 coupled to a processor 610 or FLASH memory (not shown) associated thereto. In at least some embodiments, processor 610 may execute computer-executable program instructions stored in memory 608. In at least some embodiments, processor 610 may include a microprocessor, an ASIC, and/or a state machine. In at least some embodiments, processor 610 may include, or may be in communication with, media, for example computer-readable media, which stores instructions that, when executed by processor 610, may cause processor 610 to perform one or more steps described herein. In at least some embodiments, examples of computer-readable media may include, but are not limited to, an electronic, optical, magnetic, or other storage or transmission device capable of providing a processor, such as the processor 610 of client 602a, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, client computing devices 602a through 602n may also comprise a number of external or internal devices such as a mouse, a CD-ROM, DVD, a physical or virtual keyboard, a display, a speaker, or other input or output devices. In at least some embodiments, examples of client computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In at least some embodiments, client computing devices 602a through 602n may be specifically programmed with one or more application programs in accordance with one or more principles/methodologies detailed herein. In at least some embodiments, client computing devices 602a through 602n may operate on any operating system capable of supporting a browser or browser-enabled application, such as Microsoft™, Windows™, and/or Linux. In at least some embodiments, client computing devices 602a through 602n shown may include, for example, personal computers executing a browser application program such as Microsoft Corporation's Internet Explorer™, Apple Computer, Inc.'s Safari™, Mozilla Firefox, and/or Opera. In at least some embodiments, through the client computing client devices 602a through 602n, users may communicate over exemplary network 606 with each other and/or with other systems and/or devices coupled to network 606.

As shown in FIG. 6, exemplary server devices 604 and 613 may be also coupled to network 506. Exemplary server device 604 may include a processor 605 coupled to a memory 611 that may store a network engine 617. Exemplary server device 613 may include a processor 614 coupled to a memory 616 that may store a network engine 619. In at least some embodiments, one or more client computing devices 602a through 602n may be mobile clients.

As shown in FIG. 6, exemplary server device 604 may be coupled to an exemplary network database 607; and exemplary server device 613 may be coupled to an exemplary network database 615. In at least some embodiments, exemplary databases 607 and 615 may be any type of database, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

As shown in FIG. 6, network 606 may be coupled to a cloud computing/architecture(s) 625. Cloud computing/architecture(s) 625 may include a cloud service 632 coupled to a cloud infrastructure 635 and a cloud platform 637, where the cloud platform 637 may be coupled to a cloud storage 639.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In at least some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRL-POOL, RNGs).

The aforementioned examples are, of course, illustrative and not restrictive.

As used herein, the term "user" shall have a meaning of at least one user. In at least some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In at least some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In at least some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In at least some embodiments and, optionally, in combination of any embodiment described above or below, an exemplary implementation of Neural Network may be executed as follows:

i) Define Neural Network architecture/model, ii) Transfer the input data to the exemplary neural network model, iii) Train the exemplary model incrementally, iv) determine the accuracy for a specific number of timesteps, v) apply the exemplary trained model to process the newly-received input data, vi) optionally and in parallel, continue to train the exemplary trained model with a predetermined periodicity.

In at least some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In at least some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In at least some embodiments and, optionally, in combination of any embodiment described above or below, the exemplary aggregation function may be a mathematical function that combines (e.g., sum, product, etc.) input signals to the node. In at least some embodiments and, optionally, in combination of any embodiment described above or below, an output of the exemplary aggregation function may be used as input to the exemplary activation function. In at least some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure will now be described with reference to the following numbered clauses.

Clause 1. A computer-implemented method comprising: obtaining, by a computing device, at least one metric from a framework processing large-scale data; generating, by the computing device, at least one prompt from the at least one metric; providing, by the computing device, the at least one prompt to a selected large language model (LLM), the LLM being trained with data related to the framework; converting, by the computing device, a recommendation from the LLM into a first configuration for the framework; forming, by the computing device, a second configuration by applying at least one guiderail to the first configuration; applying, by the computing device, the second configuration to the framework for processing a first data processing job; evaluating, by the computing device, a cause of failure of the first data processing job; automatically adjusting, by the computing device based on the cause of failure, the second configuration to form a third configuration; and applying, by the computing device, the third configuration to the framework for processing a second data processing job, the second data processing job being a resubmitted first data processing job.

Clause 2. The method of clause 1, further comprising storing, by the computing device, the second configuration in a centralized management unit allowing the second configuration to be accessed across different domains, applications or systems.

Clause 3. The method of clause 2, wherein the centralized management unit performs job signature matching comprising categorizing data processing jobs based on input size thereof or clustering resource availability and previous job success and/or failure.

Clause 4. The method of clause 1, wherein generating the at least one prompt comprises referencing at least one guideline for the framework.

Clause 5. The method of clause 4, wherein the at least one guideline comprises information on memory management, partition sizing or both.

Clause 6. The method of clause 1, wherein generating the at least one prompt comprises referencing at least one past job event.

Clause 7. The method of clause 1, wherein the trained LLM is trained with data obtained from one or more sources comprising at least one of: at least one best practice configuration related to the framework, at least one instruction documentation related to the framework, at least one past optimization related to the framework, or any combination thereof.

Clause 8. The method of clause 7, wherein the best practices comprise curated guidelines for optimizing the framework.

Clause 9. The method of clause 7, wherein the documentations comprise information on diagnosing and fixing at least one bottleneck of the framework.

Clause 10. The method of clause 7, wherein the past optimizations comprise at least one tuning example that demonstrate how specific configurations affect runtime and resource usage of the framework.

Clause 11. The method of clause 1, further comprising checking, by the computing device, with an iteration limiter before resubmitting the first data processing job.

Clause 12. The method of clause 1, wherein the framework is Apache Spark.

Clause 13. The method of clause 12, wherein the first, second or third configuration comprises at least one of an application setting, an environment variable, a logging configuration, a cluster manager, a dynamic allocation of a number of executors or a session configuration.

Clause 14. The method of clause 1, wherein the at least one metric comprises CPU usage, memory usage, ephemeral storage statistics, job execution time or cost data.

Clause 15. The method of clause 1, wherein the guiderail comprises a cost or a performance threshold.

Clause 16. A system, comprising: one or more processors; and a memory in communication with the one or more processors and storing instructions that, when executed by the one or more processors, cause the one or more processors to: obtain at least one metric from a framework processing large-scale data; generate at least one prompt from the at least one metric; provide the at least one prompt to a selected large language model (LLM), the LLM being trained with data related to the framework; convert a recommendation from the LLM into a first configuration for the framework; form a second configuration by applying at least one guiderail to the first configuration; apply the second configuration to the framework for processing a first data processing job; evaluate a cause of failure of the first data processing job; automatically adjust, based on the cause of failure, the second configuration to form a third configuration; and apply the third configuration to the framework for processing a second data processing job, the second data processing job being a resubmitted first data processing job.

Clause 17. The system of clause 16, further comprising a centralized management unit configured to store the second configuration to be accessed across different domains, applications or systems.

Clause 18. The system of clause 17, wherein the centralized management unit performs job signature matching comprising categorizing data processing jobs based on input size thereof or clustering resource availability and previous job success and/or failure.

Clause 19. The system of clause 16, wherein the trained LLM is trained with data obtained from one or more sources comprising at least one of: at least one best practice configuration related to the framework, at least one instruction documentation related to the framework, at least one past optimization related to the framework, or any combination thereof.

Clause 20. The system of clause 16, further comprising an iteration limiter wherein the one or more processors are caused to check with the iteration limiter before resubmitting the first data processing job.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method, comprising:

obtaining, by a computing device, at least one metric from a data processing framework based on a monitoring layer of a plurality of layers associated with the computing device, wherein the data processing framework processes large-scale data, and the at least one metric comprises a computational resource usage of the data processing framework;

generating, by the computing device, at least one prompt from the obtained at least one metric;

providing, by the computing device, the generated at least one prompt to a large language model (LLM), wherein the LLM is trained based on training data related to the data processing framework;

converting, by the computing device, a recommendation from the LLM into a first configuration for the data processing framework;

iteratively applying, by the computing device, based on a guardrail enforcement layer of the plurality of layers, at least one guardrail on the first configuration to generate a second configuration for the data processing framework, wherein the at least one guardrail includes a threshold associated with one or more computational resources for a first data processing job;

applying, by the computing device, the second configuration to the data processing framework for processing the first data processing job;

evaluating, by the computing device, a cause of failure of the first data processing job;

instructing, by the computing device, based on the evaluated cause of failure, the LLM to generate a third configuration for the data processing framework;

dynamically allocating, by the computing device, based on the third configuration, the one or more computational resources to the data processing framework; and controlling, by the computing device, the data processing framework for processing a second data processing job, wherein the processing of the second data processing job is based on the dynamically allocated one or more computational resources, and the second data processing job is a resubmitted first data processing job.

2. The computer-implemented method of claim 1, further comprising storing, by the computing device, the second configuration in a centralized management unit allowing the second configuration to be accessed across different domains, applications, or systems.

3. The computer-implemented method of claim 2, further comprising performing, by the centralized management unit, job signature matching comprising categorizing data processing jobs, wherein the categorizing of the data processing jobs is based on at least one of an input size of the data processing jobs, clustering resource availability of the data processing jobs, previous job success of the data processing jobs, or previous job failure of the data processing jobs, and the data processing jobs include the first data processing job and the second data processing job.

4. The computer-implemented method of claim 1, wherein the generating of the at least one prompt comprises referencing at least one guideline for the data processing framework.

5. The computer-implemented method of claim 4, wherein the at least one guideline comprises information on memory management, partition sizing, or both.

6. The computer-implemented method of claim 1, wherein the generating of the at least one prompt comprises referencing at least one past job event.

7. The computer-implemented method of claim 1, wherein the training data is obtained from one or more sources comprising at least one of: at least one best practice configuration related to the data processing framework, at least one instruction documentation related to the data processing framework, or at least one past optimization related to the data processing framework.

8. The computer-implemented method of claim 7, wherein the at least one best practice configuration comprises one or more curated guidelines for optimizing the data processing framework.

9. The computer-implemented method of claim 7, wherein the at least one instruction documentation comprises information on diagnosing and fixing at least one bottleneck of the data processing framework.

10. The computer-implemented method of claim 7, wherein the at least one past optimization comprises at least one tuning example that demonstrate how specific configurations affect runtime and the computational resource usage of the data processing framework.

11. The computer-implemented method of claim 1, further comprising checking, by the computing device, the second data processing job based on an iteration limiter of the computing device.

12. The computer-implemented method of claim 1, wherein the data processing framework is Apache Spark.

13. The computer-implemented method of claim 12, wherein the first configuration, the second configuration, or the third configuration comprises at least one of an application setting, an environment variable, a logging configuration, a cluster manager, a dynamic allocation of a number of executors, or a session configuration.

14. The computer-implemented method of claim 1, wherein the computational resource usage comprises CPU usage, memory usage, ephemeral storage statistics, job execution time, or cost data.

15. A system, comprising:

one or more processors; and a memory in communication with the one or more processors and storing instructions that, when executed by the one or more processors, cause the one or more processors to:

obtain at least one metric from a data processing framework based on a monitoring layer of a plurality of layers associated with the system, wherein the data processing framework processes large-scale data, and the at least one metric comprises a computational resource usage of the data processing framework;

generate at least one prompt from the obtained at least one metric;

provide the generated at least one prompt to a large language model (LLM), wherein the LLM is trained based on training data related to the data processing framework;

convert a recommendation from the LLM into a first configuration for the data processing framework;

iteratively apply, based on a guardrail enforcement layer of the plurality of layers, at least one guardrail on the first configuration to generate a second configuration for the data processing framework, wherein the at least one guardrail includes a threshold associated with one or more computational resources for a first data processing job;

apply the second configuration to the data processing framework for processing the first data processing job;

evaluate a cause of failure of the first data processing job;

instruct, based on the evaluated cause of failure, the LLM to generate a third configuration for the data processing framework;

dynamically allocate, based on the third configuration, the one or more computational resources to the data processing framework; and control the data processing framework to process a second data processing job, wherein the second data processing job is processed based on the dynamically allocated one or more computational resources, and the second data processing job is a resubmitted first data processing job.

16. The system of claim 15, further comprising a centralized management unit configured to store the second configuration to be accessed across different domains, applications, or systems, wherein the systems include the system.

17. The system of claim 16, wherein the centralized management unit is further configured to perform job signature matching comprising categorization of data processing jobs, wherein the categorization of the data processing jobs is based on at least one of an input size of the data processing jobs, clustering resource availability of the data processing jobs, previous job success of the data processing jobs, or previous job failure of the data processing jobs, and the data processing jobs include the first data process-
ing job and the second data processing job.

18. The system of claim 15, wherein the training data is
obtained from one or more sources comprising at least one
of: at least one best practice configuration related to the data 5
processing framework, at least one instruction documenta-
tion related to the data processing framework, or at least one
past optimization related to the data processing framework.

19. The system of claim 15, further comprising an itera-
tion limiter, wherein the one or more processors are further 10
configured to check the second data processing job based on
the iteration limiter.

\*    \*    \*    \*    \*